United States Patent [19]

Orosa

[11] Patent Number: 4,701,065
[45] Date of Patent: Oct. 20, 1987

[54] KNOCKDOWN FURNITURES AND THE STRUCTURAL COMPONENTS THEREFOR

[76] Inventor: Jose S. Orosa, Unit 3-C Gil-Armi Townhouse, 24 Real Street, Urdaneta Village, Makati, Metro Manila, Philippines

[21] Appl. No.: 689,423

[22] Filed: Jan. 7, 1985

[30] Foreign Application Priority Data

Dec. 11, 1984 [PH] Philippines .............................. 31563

[51] Int. Cl.⁴ .......................... B25G 3/00; F16B 9/00
[52] U.S. Cl. .................................. 403/263; 403/296; 403/407.1
[58] Field of Search ............... 403/263, 264, 296, 407; 297/440, 445; D6/369

[56] References Cited

U.S. PATENT DOCUMENTS

| | | | |
|---|---|---|---|
| 3,389,666 | 6/1968 | Schultze-Bonatz | 297/440 UX |
| 3,469,869 | 9/1969 | Ramakers | 403/264 |
| 4,067,656 | 1/1978 | Dennis | 403/296 |
| 4,116,573 | 9/1978 | Fuchs | 403/407 |
| 4,139,314 | 2/1979 | Alber | 403/407 X |
| 4,358,214 | 11/1982 | Shull | 403/263 X |

Primary Examiner—Andrew V. Kundrat
Attorney, Agent, or Firm—Nilsson, Robbins, Dalgarn, Berliner, Carson & Wurst

[57] ABSTRACT

A set of structural components for constructing knockdown furnitures is disclosed. Different kinds of furnitures can be formed by interconnecting these components. The owner is free to select and assemble the desired kind and design of furniture pieces. These structural components are preferably made of bamboo poles which are cut in predetermined lengths to form the legs, rails and couplings of the furniture. The legs and rails are provided with holes, and fitted with female fittings. The coupling is fitted with a dowel having blind threaded holes through which male fittings can be connected. Aside from making furnitures, these structural components may also used to build beach houses, rest houses, and the like.

6 Claims, 14 Drawing Figures

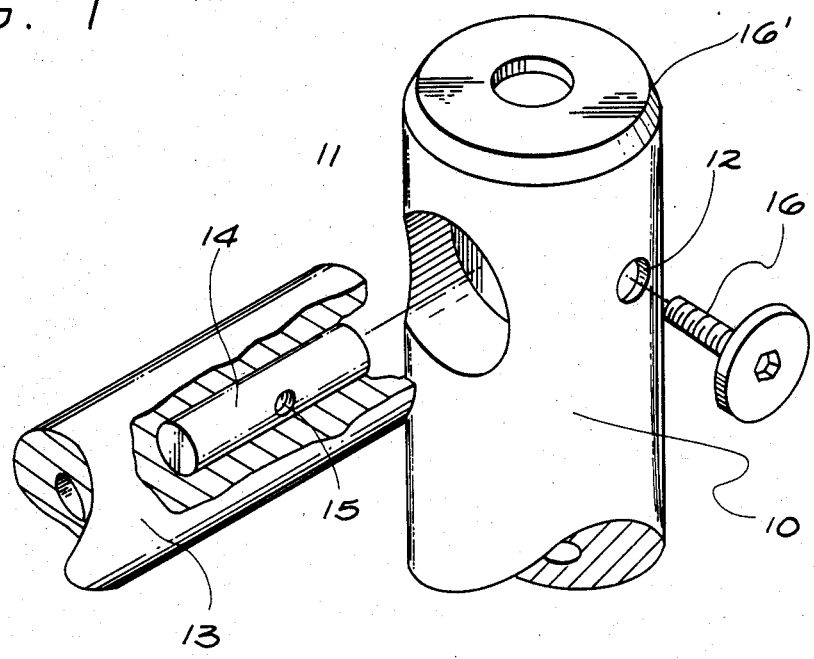
FIG. 1
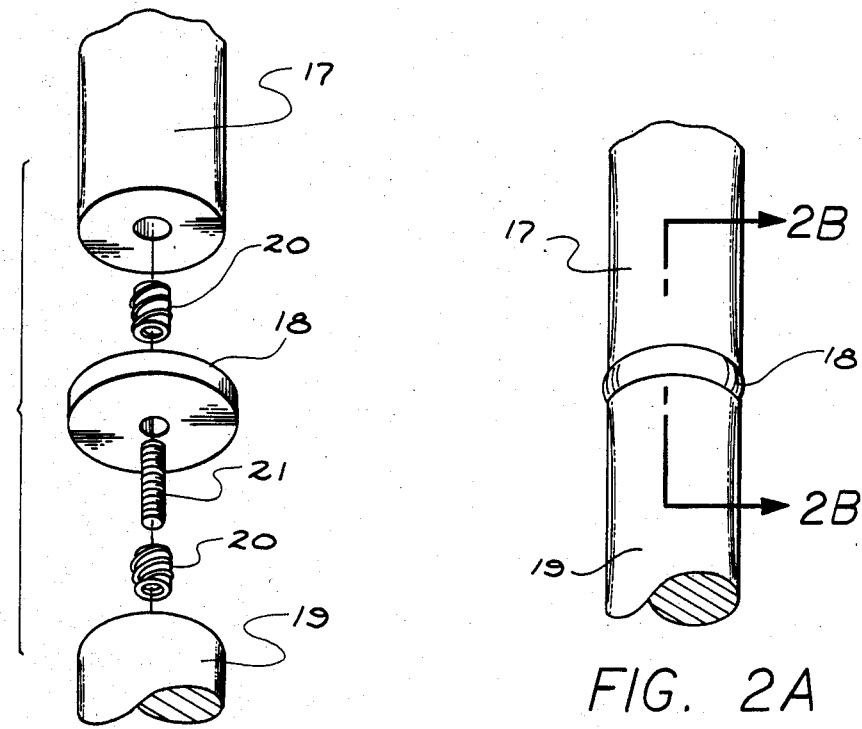
FIG. 2
FIG. 2A

KNOCKDOWN FURNITURES AND THE STRUCTURAL COMPONENTS THEREFOR

BACKGROUND AND SUMMARY OF THE INVENTION

The present invention relates in general to the art of furniture making. More specifically, it relates to the new mode of making knockdown furnitures using prefabricated structural components.

The primary object of this invention is to provide flexibility in varying the design and form of the furnitures. By means of the demountable structural components, the owner can disassemble a given furniture piece and assemble the same to form an entirely new piece of furniture that suits his taste. Just like playing with toy building blocks, he can make use of his leisure hours in testing his creativity in forming different kinds of furnitures.

Another object of this invention is to provide knockdown furnitures wherein the structural components can be fully dismounted, thus simplifying the packaging and transportation of the same.

Still another object is to provide knockdown furnitures wherein the structural components are made available in standard sizes and lengths; thus replacement of components can be easily made. Also, additional components may be bought to augment existing furniture pieces.

Other objects, advantages, and remarkable features will come into light upon reading the following detailed description taken in conjunction with the accompanying drawings wherein:

FIG. 1 is an exploded perspective view of an L-joint used in this invention;

FIG. 2 is an exploded view of a straight joint;

FIG. 2a is the assembled joint of FIG. 2;

FIG. 2b is the cross-sectional view, taken along line 2—2 of FIG. 2a;

Figure 3:
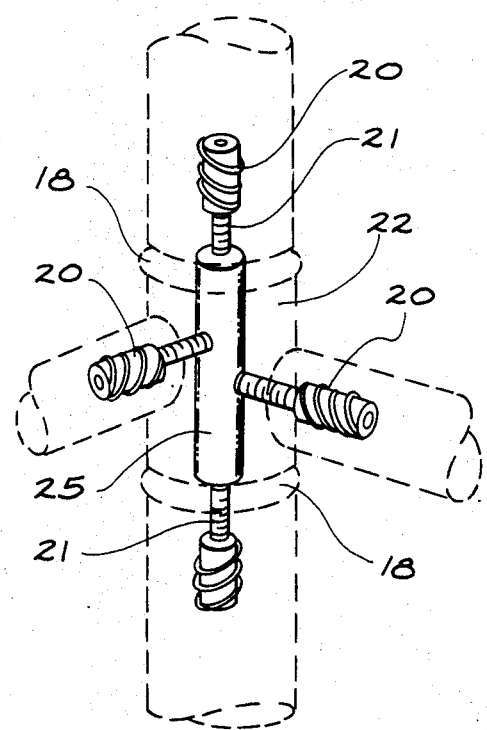
FIG. 3 is a perspective view of the bamboo pole coupling. The bamboo poles are shown in phantom lines to show the interconnection of parts.

With reference to FIG. 1, there is shown an L-joint comprising a vertical female member 10 having a transverse blind hole 11 and a bolt hole 12, a horizontal male member 13 fitted to the blind hole 11. Said male member 13 is also provided with a bolt hole (not shown) adapted to be aligned with the bolt hole 12. A dowel 14 is axially fitted to the male member 13, said dowel having a threaded blind hole 15 which is adapted to be aligned to the bolt holes. A threaded male fastener 16 fastens the two members together. For the sake of strength and appearance, it is preferable that vertical member 10 be cut near the node 16' of the bamboo pole.

Figure 2B:
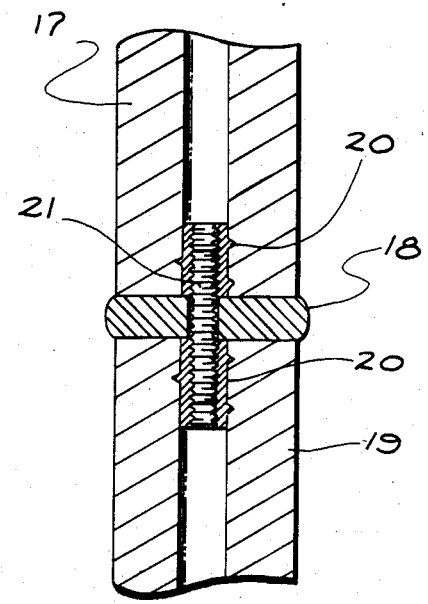

In FIG. 2 is shown a straight line joint consisting of an upper member 17, a disk spacer 18, a lower member 19, female fittings 20 and male fitting 21. The female fittings 20 are adapted to be fitted to each end of the upper and lower members 17 and 19. The male fitting 21 is used to joint these two members, and with the use of the disk spacer 18, alignment is effected, said disk spacer serves also to make it appear like a node. This particular kind of joint is used in lengthening a given leg of the furniture.

Figure 3A:
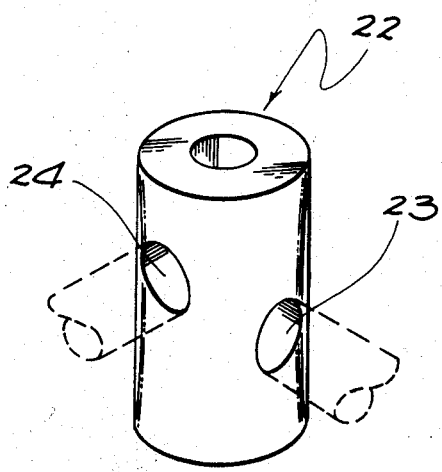
FIG. 3a is a perspective view of the first embodiment of a bamboo coupling.
Figure 3B:
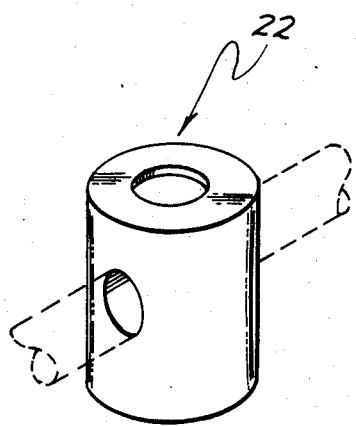
FIG. 3b, 3c, 3d, 3e show diagramatically different variation of the joints.
Figure 3C:
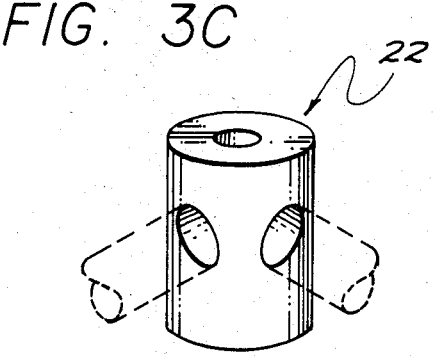
Figure 3D:
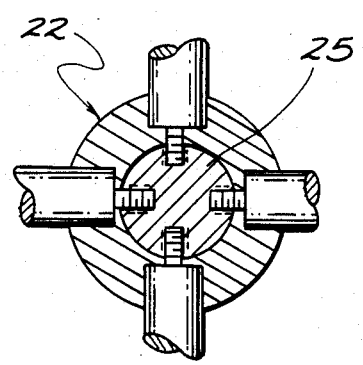

It is shown in FIG. 3 how a bamboo coupling may be used to connect the legs and rails of the furniture. A bamboo coupling designated as 22 is provided with transverse blind holes 23 and 24. These holes may be bored on the same level as shown in FIG. 3c depending on the comparative size of the bamboo and the dowel, 25 fitted thereto. Disk spacers 18 may also be used for alignment of the joint components. A cross joint 26 as shown in FIG. 3d using a multi-holed coupling may be used when stabilizing the legs of a dining table. As shown in FIG. 3, female fittings 20 and male fittings 21 are extensively used. These fittings enable easy assembly and disassembly of the different structural components.

Figure 4:
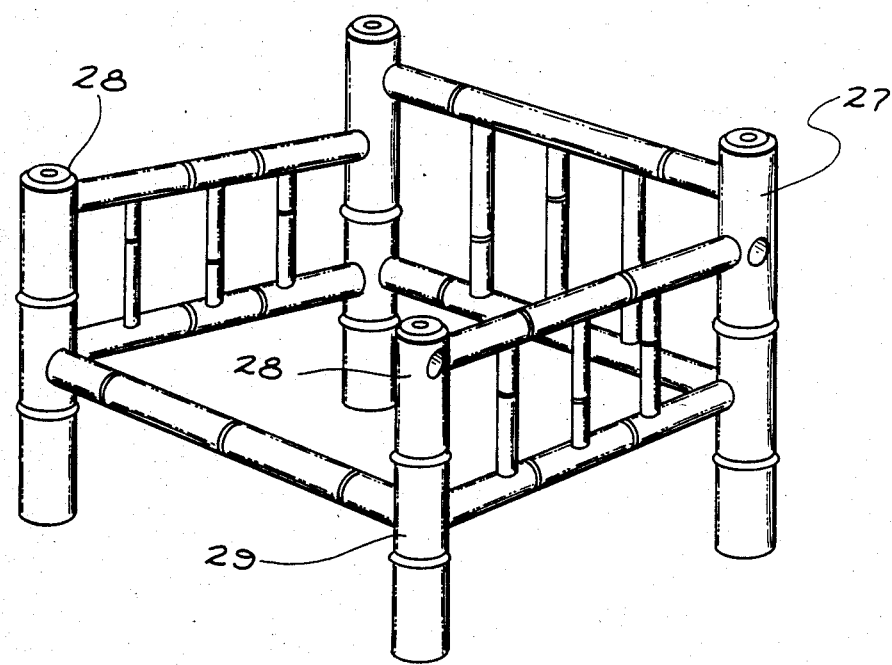
FIG. 4 is a perspective view of an armchair made in accordance with this utility model.

In FIG. 4 is shown an armchair 27 which is constructed in accordance with this invention. The upper front and back corners 28 and 29 made use of the L-joint shown in FIG. 1, while the lower front and back corners made use of the coupling joint shown in FIGS. 3, 3a and 3b.

Figure 3E:
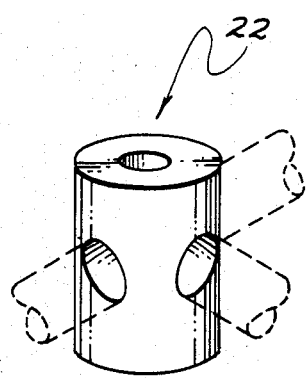
Figure 4A:
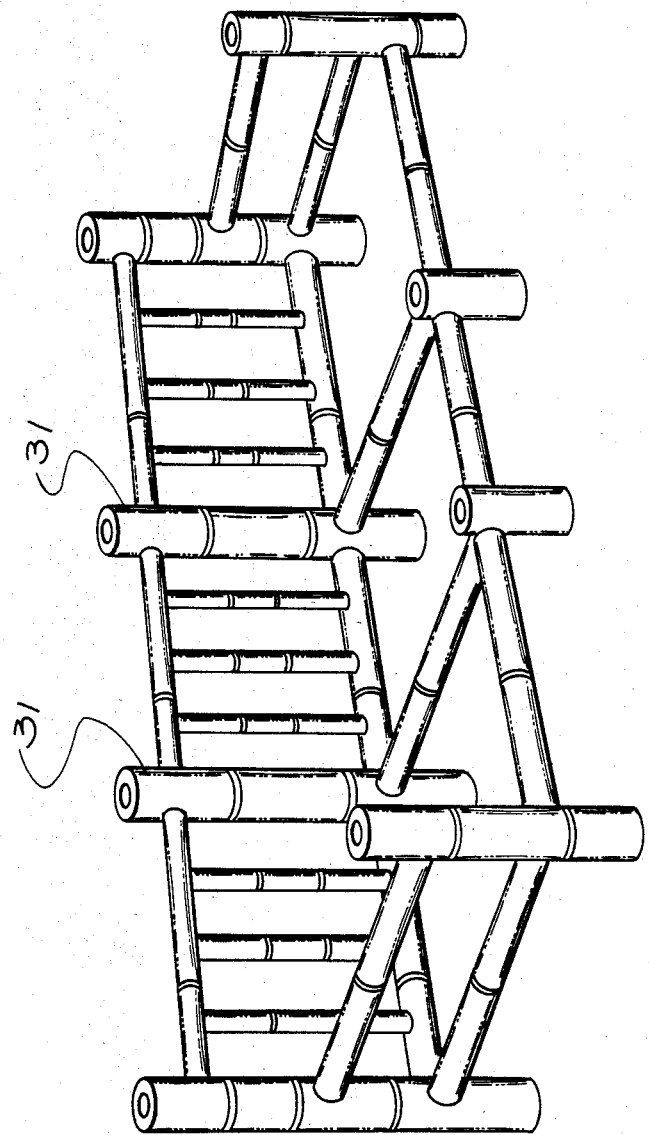
FIG. 4a is a perspective view of a three-seater armchair.

The three seater armchair shown in FIG. 4a is constructed like the one seater armchair shown in FIG. 4. The tee joints 31 at the back portion made use of a joint like that shown in FIG. 3b. Other corner joints are similar to the ones used in FIG. 4. The forward joints are similar to the joint shown in FIG. 3e.

Figure 5:
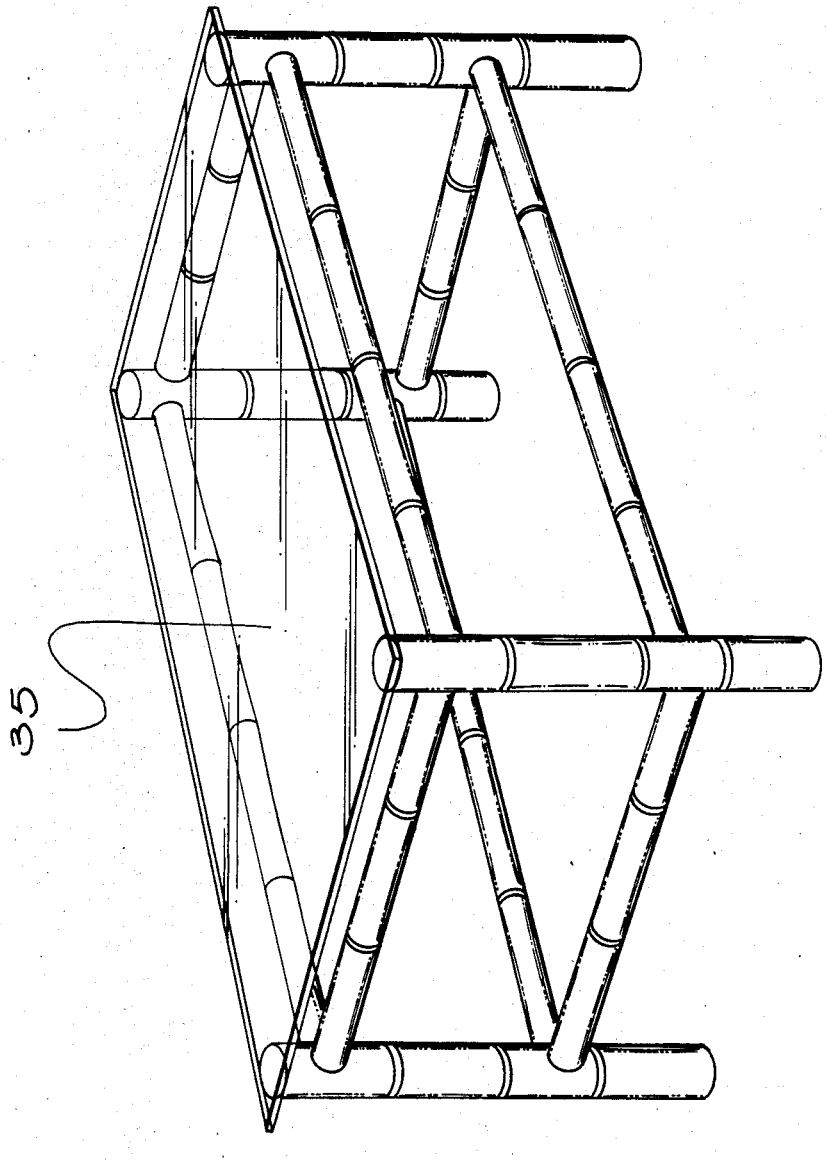
FIG. 5 is a perspective view of a center table.

As shown in FIG. 5, a center table is provided with a glass top 35. This glass top is mounted on a structural framework which is made in accordance with this invention. The corner joints are similar to the one previously discussed.

Figure 6:
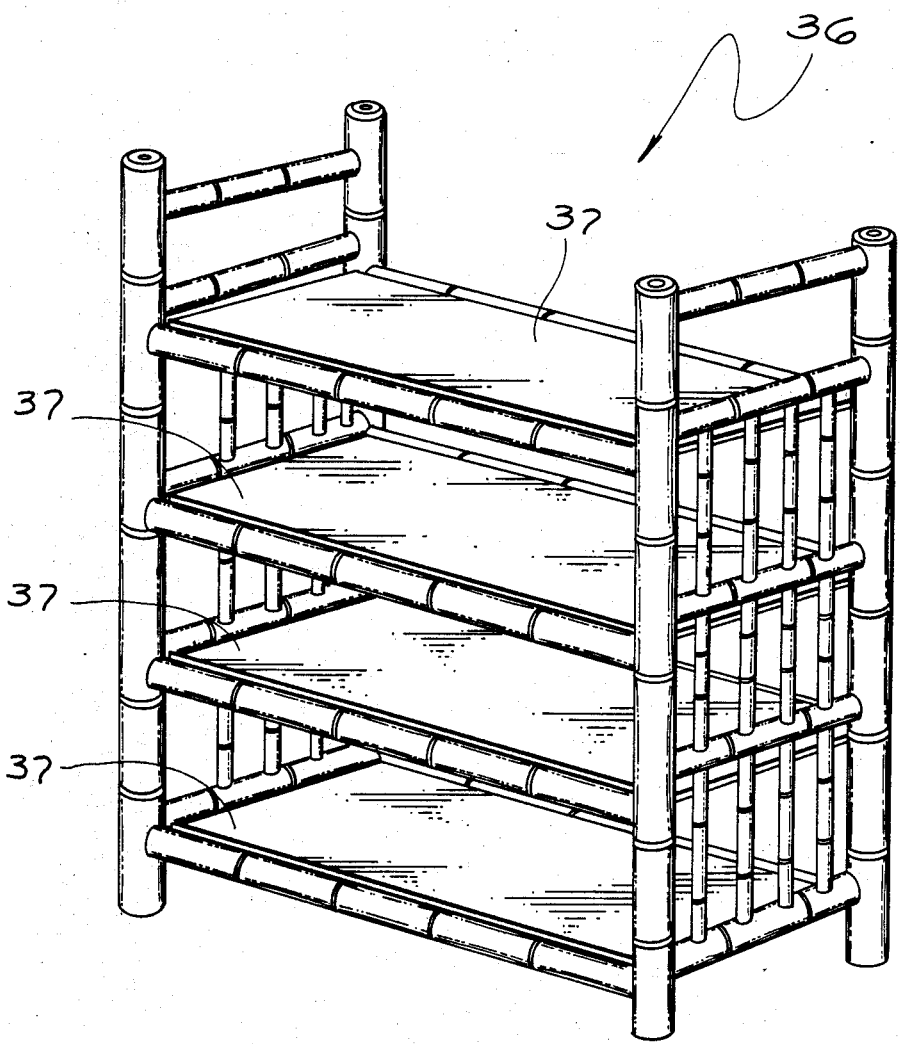
FIG. 6 is a perspective view of an etagere assembled in accordance with this invention.

An etagere 36 which is shown in FIG. 6 is similarly constructed in accordance with this invention. Plywood panels 37 may be laid on top of every shelf. Note that the corner joints used are the same corner joints shown in FIGS. 3, 3a, 3b, and 3d.

It is obvious that the jointing means disclosed herein may be used to interconnect the structural components of beach houses, rest houses, and the like. Aside from bamboo poles, other materials like rattan, wood, and metals may also be used.

I claim:

1. Knockdown furniture comprising a set of structural components which are interconnected with each other to form the desired kind and design of furniture pieces, said structural components comprising of predetermined number of legs, rails and couplings which are cut in predetermined lengths from long bamboo poles, said legs and rails being fitted female fittings; at least one of said female fittings being formed with a bolt hole, and at least one of said couplings being fitted with a dowel which is provided with a blind threaded hole aligned with said bolthole whereby said legs and rails are joined to the couplings by means of the male fittings.

2. An L-joint for knockdown furnitures comprising a vertical female member having a transverse blind hole, and a bolt perpendicular to and in communication with said blind hole; a horizontal male member fitted to the blind hole of the vertical member, said male member having also but hole; a dowel axially fitted to the horizontal member, said dowel having threaded blind hole which is adapted to be aligned to the bolt holes; and a threaded male fastener screwably fitted to the bolt holes and to the threaded blind hole.

3. A jointing means for interconnecting predetermined length and diameter of bamboo poles comprising a bamboo pole coupling having at least one transverse hole; a dowel axially fitted to said bamboo pole coupling, said dowel having at least one threaded axial blind hole and at least one threaded transverse blind hole, the latter being aligned to the transverse hole of the bamboo pole coupling; at least one bamboo disk spacer, positioned on one end of the bamboo pole coupling; a horizontal bamboo pole axially fitted with an internally threaded female member; a vertical bamboo pole similarly fitted with a female member like the former; and a number of threaded male fasteners the ends of which are fitted to the threaded blind holes of the dowel and the other ends to the corresponding internally threaded portions of the horizontal and vertical bamboo poles.

4. A jointing means as in claim 3 wherein two transverse blind holes are provided on the dowel and same are in right angle relationship with each other, said holes being aligned to the corresponding holes on the bamboo pole segment.

5. A jointing means as in claim 3 wherein three transverse blind holes are provided on the dowel, the first two being in alignment, and the third is perpendicular to the two holes thereby forming a tee joint, said holes on the dowel being aligned with corresponding holes on the bamboo pole coupling.

6. A jointing means as in claim 3 wherein four transverse blind holes ar provided on the dowel and same are ninety degrees (90°) apart said holes being aligned with the corresponding holes on the bamboo pole segment.

* * * * *